United States Patent [19]

Bosworth et al.

[11] 3,718,250
[45] Feb. 27, 1973

[54] CONSTANT TENSIONING DEVICE FOR THE CHAINS OF CONVEYORS

[75] Inventors: Delbert B. Bosworth, Portland; Joseph R. Fournier, Saco, both of Maine

[73] Assignee: United Industrial Syndicate, Inc., Portland, Maine

[22] Filed: April 29, 1971

[21] Appl. No.: 138,504

[52] U.S. Cl. .............................. 198/208, 74/242.14
[51] Int. Cl. .............................................. B65g 15/30
[58] Field of Search ....... 198/208; 74/242.14, 242.15

[56] References Cited

UNITED STATES PATENTS

| | | | |
|---|---|---|---|
| 875,389 | 12/1907 | Theede | 198/208 |
| 2,648,424 | 8/1953 | Bateman | 198/208 |
| 3,408,687 | 11/1968 | Amundson | 198/208 X |
| 1,523,988 | 1/1925 | Vance | 198/208 |

Primary Examiner—Evon C. Blunk
Assistant Examiner—H. S. Lane
Attorney—Abbott Spear

[57] ABSTRACT

A device is disclosed for tensioning a pair of vertically spaced conveyor chains. The device has upper and lower pairs of laterally spaced guide rods and sprocket shafts, one for each pair of guide rods and having transverse bores through which they extend. A chain supporting sprocket is rotatably mounted on each shaft. Each shaft also has a block mounted thereon between the guide rods. Each device also includes a fluid pressure operated unit of the piston-cylinder type with its stem pivotally connected to the middle of a pressure applying member whose extremities are in engagement with the block. With a predetermined fluid pressure delivered to the unit, either one or both of the sprockets is urged in a chain-tightening direction.

9 Claims, 4 Drawing Figures

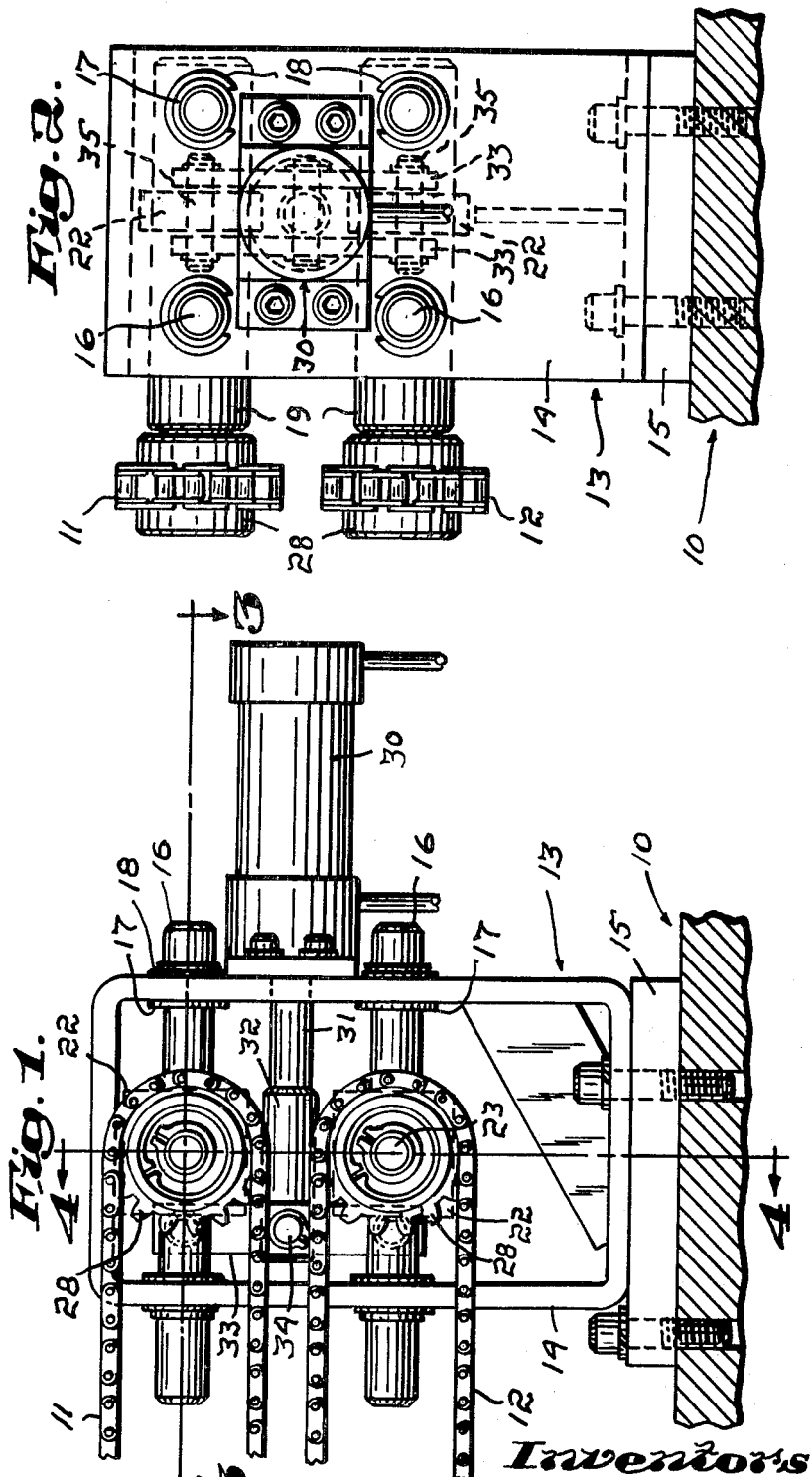

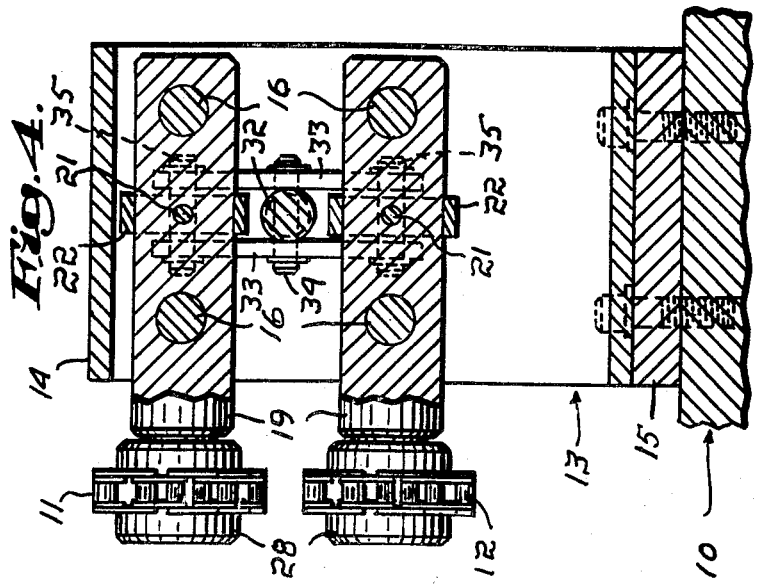
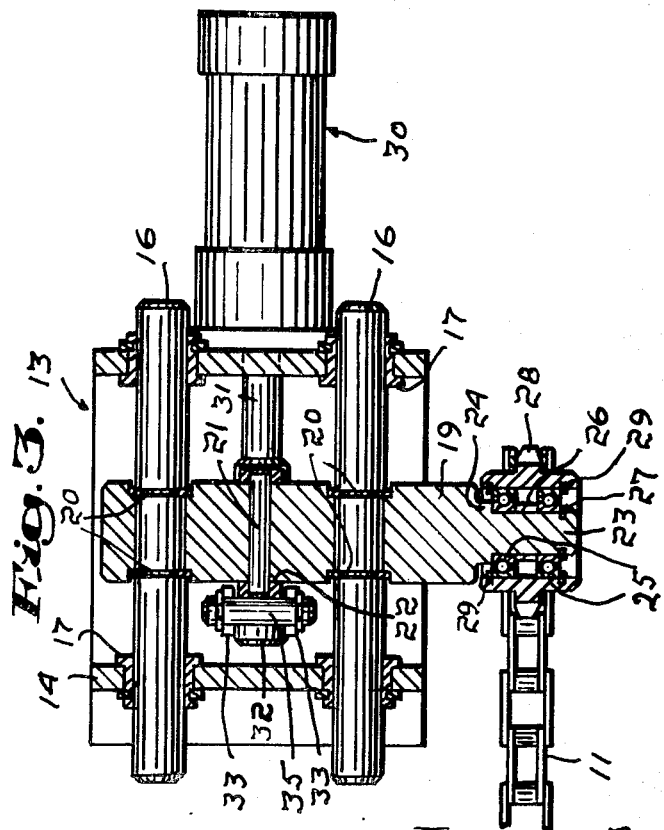

CONSTANT TENSIONING DEVICE FOR THE CHAINS OF CONVEYORS

The present invention relates to devices for use in maintaining constant tensions on conveyor chains, particularly on corresponding chains of systems employing article-conveying and hold-down conveyors.

It has long been recognized that conveyors for many purposes had to be provided with means to enable them to be tensioned and many different types are available including air-operated devices. In systems employing supporting and hold-down conveyors, particularly where a marginal grip on the conveyed product has to be constantly maintained, it is necessary to relate positively the tension of the chains of both conveyors to a predetermined factor for if either conveyor is not under sufficient tension, the grip on the conveyed material will be so insecure that operations such as printing, molding and blanking are not accurately performed. By way of example, at the start of a run, the conveyor chains may be under proper tension but when the chains become warn, they will become so relaxed that slippage will result.

The principal objective of the present invention is to provide chain tensioning means that ensure constant tensioning of the chains of both the supporting and hold-down conveyors. In accordance with the invention, this objective is attained by providing, at one end and at both sides of a conveyor system employing such conveyors, a device that includes a fluid-pressure operated unit of the piston-cylinder type. The device has a pair of vertically spaced sprocket-supporting shafts with each shaft supported by a pair of laterally spaced guide rods. Each shaft has a block between its guide rods and the stem of the power operated unit has a pivotal connection with the middle portion of a pressure-applying member each of whose extremities are in engagement with an appropriate block. With a predetermined fluid pressure supplied to the unit, the pressure-applying member is operative to tension either one or both chains.

A particular objective of the invention is to provide a construction that is relatively inexpensive, an objective attained by providing supporting structure in the form of an open-sided rectangular frame welded to a base that may be a bar and readily braced internally.

Another objective of the invention is to provide a construction that minimizes the use of bearings, an objective attained by supporting each sprocket on its shaft by means of ball bearing units and having the guide rods slidably supported in chain-tightening and chain-relaxing directions by bushings fixed in the front and rear walls of the supporting structure.

In the accompanying drawings, there is shown an embodiment of the invention from which these and other of its objectives, novel features, and advantages will be apparent.

In the drawings:

FIG. 1 is a side view of a chain-tightening device in accordance with the invention;

FIG. 2 is a rear end view of the device;

FIG. 3 is a section taken approximately along the indicated lines 3—3 of FIG. 1; and FIG. 4 is a section taken approximately along the indicated lines 4—4 thereof.

The base of the apparatus is generally indicated at 10, the apparatus being of the type utilizing a conveyor system comprising an upper hold-down conveyor and a lower supporting conveyor. Each such conveyor has a pair of chains and in the embodiment of the invention herein detailed, the chains of each conveyor are not interconnected and are to be separately tensioned but with the chains at each side being tensioned by a common unit. As the units at each side of the conveyors may be identical, only one chain of each conveyor and only one unit is shown. The upper conveyor is indicated by the chain 11 and the lower conveyor is indicated by the chain 12.

The tensioning unit for the chains 11 and 12 is generally indicated at 13 and is shown as an open-sided, rectangular frame 14 welded to a bar 15 and bolted to the base 10. A laterally spaced upper pair of guide rods 16 and a laterally spaced lower pair of guide rods 16 are slidably supported by bushings 17 secured in bores in the front and rear walls of the frame 14 by retaining rings 18.

Stub shafts 19, one for each pair of guide rods 16, are provided with transverse bores through each of which an appropriate one of the guide rods 16 extend and which open through flattened areas that provide seats for retaining rings 20 by which the stub shafts 19 are fixed to the guide rods 16. Each stub shaft 19 is also provided with an intermediate transverse bore for a roll pin 21. A contact block 22 is provided for each stub shaft 19 and has a bore enabling it to be mounted thereon in a position in which a roll pin 21 may be inserted therethrough to fix that block to its stub shaft 19.

Each stub shaft 19 has an end 23 of reduced diameter see FIG. 3, providing a shoulder 24 to which the inner races of a pair of ball bearing units 25 are fitted and which are axially separated by a spacer 26 with the inner races and the spacer being held by a retainer 27. The outer races of the units 25 are fitted within a sprocket 28 between retainers 29.

The base of a fluid pressure operated, piston-cylinder unit generally indicated at 30 is bolted to the rear wall of the frame 14 with its stem 31 extending therein and having a clevis rod 32 threaded thereon. A pair of side members 33 are centrally interconnected by a clevis pin 34 extending through the clevis rod 32 and their extremities are interconnected by clevis pins 35 each engaging a face of a contact block 22 with said extremities straddling the sides thereof. It will be noted that the blocks 22 present parallel surfaces at all times to the clevis pins 35 so that there is no appreciable side thrust transmitted to the clevis pin 34. It will also be noted that the side members 33 hold the stem 31 from turning.

From the foregoing, it will be appreciated that fluid under a predetermined pressure is delivered to the unit 30. As either or both chains become warm, for example, they stretch slightly to an extent such that the efficiency of the conveyor system would be adversely affected were it not for the fact that the pressure operated unit 30 is operative to draw either or both of the chains in a tensioning direction in the event their tension becomes relaxed.

We claim:

1. Tensioning means for conveyor systems of the type having independent upper and lower conveyor chains each separately supported by sprockets at their ends, said means comprising a device for one of said ends and including supporting structure, a pair of parallel stub shafts, chain supporting sprockets rotatably mounted on said shafts and means attaching each stub shaft to said structure to move relative thereto in chain-tightening or chain-releasing directions, reciprocable pressure operated means and a pressure applying member to the intermediate part of which said pressure operated means is pivotally connected with its pivot axis parallel with the axes of the stub shafts and whose ends are each in pressure-applying engagement with a respective one of said shafts.

2. The tensioning means of claim 1 in which shaft attaching means comprise laterally spaced pairs of guide rods, the pairs of guide rods being vertically spaced, and the stub shafts are connected to respective ones of said pairs.

3. The tensioning means of claim 2 in which the guide rods are slidably supported by the front and rear walls of the supporting structure.

4. The tensioning device of claim 1 in which each stub shaft has a pair of transverse bores through which its guide rods extend.

5. The tensioning device of claim 4 in which each stub shaft is fixed to its guide rods.

6. The tensioning device of claim 3 in which each stub shaft includes a fixed block engaged by an extremity of the pressure-applying member.

7. The tensioning means of claim 5 in which the blocks have vertically disposed faces paralleling the stub shafts, and each extremity of the pressure-applying member includes a pin in engagement with an appropriate one of said faces.

8. The tensioning means of claim 6 in which the blocks have vertically disposed faces paralleling the stub shafts, the pressure-applying member consists of two side parts straddling the sides of the blocks, and clevis pins interconnecting the extremities of the side parts, one of each block and in engagement with the vertically disposed face thereof, said blocks holding the stem of the fluid pressure operated means from turning.

9. The tensioning device of claim 1 in which the supporting structure comprises an open-sided, rectangular frame and a base in the form of a bar to which the bottom of the frame is welded.

* * * * *